E. HAINES.
ATTACHMENT FOR LADIES' PURSES.
APPLICATION FILED MAR. 30, 1915.
1,217,171. Patented Feb. 27, 1917.
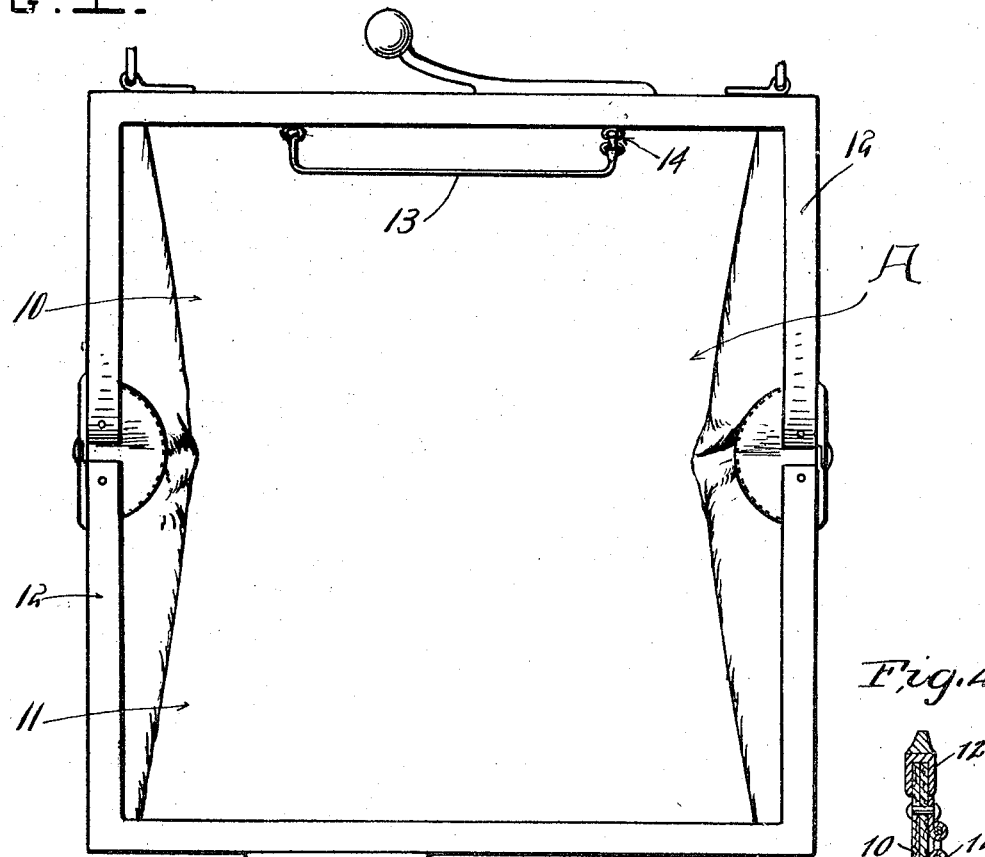
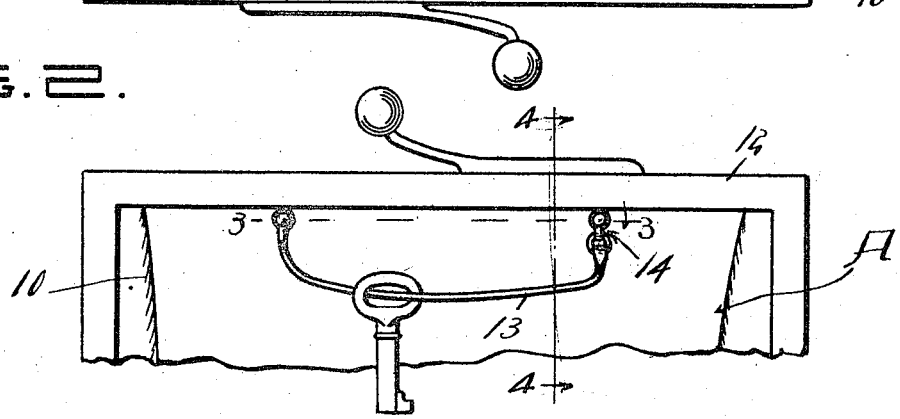
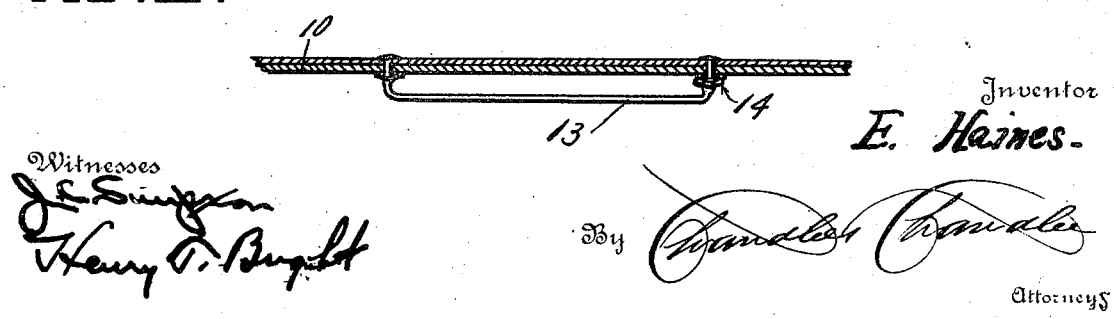

UNITED STATES PATENT OFFICE.

ELIZABETH HAINES, OF JOHNSTOWN, PENNSYLVANIA.

ATTACHMENT FOR LADIES' PURSES.

1,217,171.  Specification of Letters Patent. Patented Feb. 27, 1917.

Application filed March 30, 1915. Serial No. 18,148.

*To all whom it may concern:*

Be it known that I, ELIZABETH HAINES, a citizen of the United States, residing at Johnstown, in the county of Cambria, State of Pennsylvania, have invented certain new and useful Improvements in Attachments for Ladies' Purses; and I do hereby declare the following to be a full, clear, and exact description of the invention, such as will enable others skilled in the art to which it appertains to make and use the same.

This invention relates to attachments for ladies' purses.

The object of the invention resides in the provision of an attachment of the type named through the instrumentality of which keys, rings, small pocket books and the like may be supported near the mouth of the purse so as to be readily accessible as soon as the purse is opened.

With the above and other objects in view the invention consists in the details of construction and in the arrangement and combination of parts to be hereinafter more fully described and particularly pointed out in the appended claim.

In describing the invention in detail reference will be had to the accompanying drawing wherein like characters of reference denote corresponding parts in the several views, and in which—

Figure 1 is a plan view of a purse in open position and showing the attachment applied;

Fig. 2, a vertical section of what is shown in Fig. 1;

Fig. 3, a section on the line 3—3 of Fig. 2, and

Fig. 4 is a section on the line 4—4 of Fig. 2.

Referring to the drawing A indicates generally a lady's purse the mouth of which is formed by hingedly connected sections 10 and 11 and each of these sections includes a metallic reinforcing frame 12.

The attachment proper comprises a curved bar 13 disposed on the inner side of the section 10 and relatively near the free end thereof. One end of the bar 13 is riveted or otherwise suitably secured to the related frame 12 while the other end thereof is free and is adapted to be detachably secured to the frame 12 through the medium of a suitable fastening device 14. In the use of the attachment the free end is released and the article or articles it is desired to hold near the mouth of the purse are engaged over the bar 13 and the free end of the latter again secured to the frame 12 by means of the fastening device 14. It will thus be seen that the article supported by the bar 13 can be reached without trouble as soon as the purse is opened.

What is claimed is:—

The combination with a purse including a mouth formed of hingedly connected sections each of which embodies a rigid frame, of a curved bar disposed on the inner side of one of said sections and having one end secured directly to the frame and its other end free, and means for detachably securing the free end of the bar to the related sections.

In testimony whereof I affix my signature in the presence of two witnesses.

ELIZABETH HAINES.

Witnesses:
 JOSE HETZLINE,
 E. T. MCUNLIS.